United States Patent Office 3,472,815
Patented Oct. 14, 1969

3,472,815
NOVEL POLYIMIDE-IMINES AND POLYAMIDE-IMINES
Omar O. Juveland, South Holland, Ill., assignor to Standard Oil Company, Chicago, Ill., a corporation of Indiana
No Drawing. Filed June 2, 1967, Ser. No. 647,290
Int. Cl. C08g 20/34; H01b 3/30
U.S. Cl. 260—47                                    16 Claims

ABSTRACT OF THE DISCLOSURE

Novel polyimide-imine and polyamide-imine polymers useful as wire enamel coatings are obtained when aromatic diamines are reacted with tricarboxylic anhydride carbonyl compounds in a nitrogen containing organic polar solvent.

---

This invention relates to polymers which are condensation products of tricarboxylic anhydride carbonyl compounds and aromatic diamines. The polyimide-imine and polyamide-imine polymers and coating compositions can be heat cured to insoluble, inflexible, tough, adherent, heat resistant and di-electric materials. The polymers of this invention may be described as polyamide-imines which are capable when heated of conversion to the polyimide-imine form. Such polyamide-imines are high molecular weight polymeric compounds having in their molecule units of

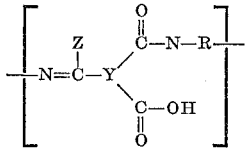

wherein Y is a trivalent carbocyclic aromatic radical having from 1 to 4 aromatic rings. Trivalent radicals of benzene, naphthalene diphenyl, diphenylether, diphenylsulfide, diphenylsulfone and ditolylether, benzylphenone and the like are useful. R is a divalent aromatic hydrocarbon radical. This hydrocarbon radical consists of R', which is a divalent aromatic hydrocarbon radical or two R' divalent aromatic hydrocarbon radicals joined by stable linkages such as oxy, carbonyl, sulfonyl, sulfur, methylene, ethylene, propylene, tetramethylene and their various isomers. For example, the following compounds can be included: —R'—O'—R', —R'—CH$_2$—R'—,

—R'(CH$_2$)$_2$—R'—

—R'—(CH$_2$)$_3$—R'—, —R'(CH$_2$)$_4$—R'— and

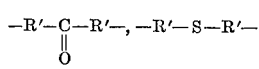

Z is a hydrogen, monovalent hydrocarbon radical having from 1 to 5 carbon atoms or monovalent aromatic hydrocarbon having from 1 to 4 benzene rings, thus Z can be hydrogen or an aliphatic or an aromatic hydrocarbon radical such as methyl, ethyl, propyl, isopropyl, butyl, isobutyl, benzyl, phenyl, tolyl, naphthyl. The molecular weight of these polyamide-imines is sufficiently high to produce upon heating a film-forming polymer. Said polyamide-imines are susceptible upon curing to form polyimide-imines having recurring units of:

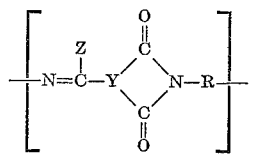

wherein R is a divalent aromatic hydrocarbon radical. This hydrocarbon radical consists of R', which is a divalent aromatic hydrocarbon or two R' divalent hydrocarbon radicals joined by the same stable linkages as described above. The values for Y and Z are the same as described above for the polyamide-imines.

The polymers of this invention are advantageously prepared by reacting tricarboxylic anhydride carbonyl compounds having the following formula:

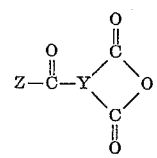

wherein Z is a hydrogen or any aliphatic hydrocarbon containing about 1 to 5 carbon atoms or an aromatic hydrocarbon containing from 1 to 4 aromatic rings with aromatic diamines. Representative aliphatic and aromatic hydrocarbon radicals include methyl, ethyl, propyl, isopropyl, butyl, phenyl, benzyl, tolyl and naphthyl. Y can be a substituted or an unsubstituted compound having from 1 to 4 aromatic rings. Y represents a trivalent aromatic radical having from 1 to 4 aromatic rings. Trivalent radicals of benzene, naphthalene, biphenyl, diphenyl ether, diphenyl sulfide, diphenylsulfone, diphenylamine, ditolyl ether, benzophenone and the like are useful compounds.

These tricarboxylic anhydride compounds are reacted with aromatic diamines to produce the novel polyamide-imines and polyimide-imines. Generally, aromatic diamines have from 1 to 4 aromatic rings, advantageously from about 1 to 2 aromatic rings. Aromatic carbocyclic diamines having more than 1 aromatic ring may be further characterized as polycyclic aromatic compounds having two primary amino groups on an interconnected aromatic polycyclic nucleus. The aromatic rings may be interconnected by condensation as in naphthalene or phenanthrene type structures, or may be bridged, either directly as in diphenyl diamines, or indirectly as for example where two aromatic rings are joined with reactive stable inert linkages such as oxy, methylene, ethylene, propylene, isopropylene, tetramethylene and their various isomers, and sulfonyl and sulfide. Suitable aromatic nuclei include phenylene, naphthalene, anthracene, naphthacenylene and the like; diphenylene, terphenylene, phenylnaphthalene, quaterphenylene and the like. All these aromatic rings may be separated by the following groups: oxy, carbonyl, sulfonyl, thio, methylene, ethylene, propylene, isopropylene, tetramethylene and their various isomers. Representative diamines useful in our process include benzidine, 4',4'-diamino-diphenyl propane, 4,4'-diamino-diphenyl methane, 4,4'-diamino-diphenyl ether, 4,4'-diamino-diphenyl sulfide, 4,4'-diamino-diphenyl sulfonate, meta-phenylene diamine, paraphenylene diamine, hexamethylene diamine, 4,4-dimethylheptamethyl diamine, 2,11-dodecane diamine, p,p'-methylenebis (aniline) and p,p'-oxybis (aniline) also phenylene diamines. The preferred diamines are p,p'-methylenebis (aniline) and p,p'-oxybis (aniline).

Usually the reaction is carried out in the presence of an aromatic polar solvent such as N,N-dimethyl acetamide, N-methylpyrrolidone, N,N-dimethylformamide, dimethylsulfoxide and the like with N,N-dimethyl acetamide and N-methylpyrrolidone being preferred. The reaction should be carried out under substantially anhydrous conditions and at a temperature of about 0° C. to 100° C., and advantageously about 50° C., although temperatures down to about −25° C. are also suitable. The time of reaction depends on the temperature, varying from about 0.01 to 10.0 hours, with 2 to 3 hours at 25 to 50° C. recommended.

The reactants are preferably present in essentially an equimolar ratio. Variation with limits of plus or minus 3 mole percent of either starting material will usually have only minor effects on product properties. Variations as high as plus or minus 10 mole percent may be suitable for less demanding applications from the standpoint of high flexural requirements than wire coating enamels.

The initial reaction between the tricarboxylic anhydride carbonyl compounds and the diamines results in a high molecular weight polyamide-imine having an amide content of at least 50% of the polymeric linking units in the polymer. Such products are readily soluble in such organic polar solvents as dimethyl acetamide, N-methylpyrrolidone, N,N-dimethylformamide, N,N-dimethylsulfoxide and the like.

The reaction thus may be considered a process for preparing high molecular weight solid polymers having film-forming properties in a nitrogen containing organic polar solvent. This process comprises reacting essentially equimolar amounts of an aromatic diamine and tricarboxylic anhydride carbonyl compound in an organic polar solvent under substantially anhydrous conditions, and for a period of time and at temperature controlled to produce a polymer with free carboxyl groups and amide groups available for further reaction, the polymer being soluble in said organic polar solvent. The soluble polymers have a minimum viscosity when dissolved in a solvent such as dimethyl acetamide of about 0.1, preferable about 0.3 to 5.0. The relative viscosity is measured in a thermo-statted bath at 30° C. and the polymer concentration is kept under 1%. The formula on page 34 of the Sorenson and Campbell textbook "Preparative Methods of Polymer Chemistry" (1961) is used to calculate inherent viscosity. The inherent viscosity varies somewhat with the particular diamine employed in the reaction. The polyamide-imine of the first reaction is soluble in strongly polar nitrogen containing organic solvents, usually in appreciable amounts. Based on N,N-dimethyl acetamide, solutions containing about 15 to 50 percent solids by weight are obtainable. For applications requiring use of solutions producing wire coating, impregnating varnishes and the like, solutions of about 25 to 45 weight percent are desired. Such concentrations of solutions is a good balance between solid contents and solution viscosity for ease of handling in most practical applications. The viscosities of such solutions are in the range of 10 to 400 poises.

The first category of the polyamide-imine of the invention may be regarded as partially polymerized products of relatively high molecular weight which are soluble in organic polar solvents and which are capable of further reacting, or "curing" upon application of heat. Usually the polymers are heated at a temperature of about 150 to 400° C. They may be employed in solution, in high solids' solutions or as solvents in solution in high solids suspension or as powders in the production of coatings, laminates, films, fibers, molded products and as impregnating varnishes. The second category of polymers are insoluble in organic polar solvents and may be regarded as "cured" end-products in the way of coatings, laminates, films, enamel wire coatings and the like. The latter are characterized by resistance to solvents, by high thermal stability, and by good electrical characteristics.

Infrared analyses of the insoluble polyimide-imines show characteristic absorption at 5.60 microns, 5.80 microns, 6.12 microns and 7.25 microns. The absorption at 5.60 microns, 5.80 microns and 7.25 microns indicate the cyclic imide structure. The absorption at 6.12 wave length indicates the carbon nitrogen double bond on the imine structure. The infrared analyses of the soluble polyamide-imines indicate the similar absorption as for the insoluble imide-imines except that additional absorption for the amide group is absorbed at 6.00 microns and 6.46 microns.

By way of a particular example, the reaction of a 4-aldehyde of trimellitic anhydride and an aromatic diamine is utilized. The 4-aldehyde of trimellitic anhydride in dimethyl acetamide and p,p'-oxybis (aniline) in dimethyl acetamide are mixed together in equivalent amounts plus or minus 0.1 mole percent. The resulting solution is cooled to 25° C. and is purged with dry nitrogen. During reaction of the mixture, a cooling bath is utilized to keep the solution temperature of about 25° C. After several hours the viscosity of the solution is generally at a maximum value. Polymerization is essentially complete and the reaction mixture is cooled to room temperature and may be held overnight without degradation of the product, but it is preferred to store the mixture at 0–25° C. As noted above, the soluble polyamide-imines, according to more specific aspects of the invention, are converted to tough, infusible and insoluble polyimide-imine resins by an internal imidization reaction, inducible by heat. Advantageously, this is accomplished in the process of forming coatings, fibers, impregnated and molded articles. For example, a solution of the product, that is the polyamide-imine is applied to wire or other surface heated to a temperature of about 150 to 400° C., usually about 300° C., for a time sufficient to form the insoluble polyimide-imine. At 300° C., about one minute is usually sufficient.

In this manner, surface sheet materials made out of metal like steel, aluminum, nickel, etc., for example, or various alloys, can be coated. A fabric or any piece of clothing made out of cotton, nylon, wool or any other material can be coated by depositing the polyamide in solution on said fabric and then heat curing it, which converts a polyamide to the polyamide-imide form.

In another aspect of this invention, the conversion of the soluble polyamide into the insoluble polyamide-imide form is accomplished by curing the soluble polymer for a suitable time at an elevated temperature sufficient to effectively and substantially convert the carboxyl and amide groups to imide groups, and thereby produce a second polymer which is insoluble in the organic solvent.

The invention is further exemplified below:

EXAMPLE I 5.28 g. (0.03 m.) of the 4-aldehyde of trimellitic anhydride was dissolved in 20 cc. dimethyl acetamide. Likewise, 6.0 g. (0.03 m.) of p,p'-oxybis (aniline) was dissolved in 20 cc. dimethyl acetamide. The solutions were mixed and maintained at 0–25° C. with stirring for 2 hours. The solution became viscous immediately after mixing. The solution was added to cold water to precipitate the granular polymer. The polymer was then extracted with benzene and dried in a vacuum oven at 60° C. The yield of polymer was 9.55 g. The polyamide-imines sample was subject to infrared analyses, and the following absorption bands were observed: 5.60 microns, 5.80 microns, 6.00 microns, 6.12 microns, 6.46 microns, 7.25 microns and 8.03 microns.

EXAMPLE II

The process of Example I was repeated running the experiment at 100° C.–120° C. The products were similar except that only polyimide-imines were prepared having infrared absorption at 5.60 microns, 5.80 microns, 6.12 microns, 7.25 microns and 8.03 microns.

EXAMPLE III

The process of Example I was repeated using p,p'-methylenebis (aniline) as the diamine. The product had properties indistinguishable from those shown in Example I.

EXAMPLE IV

The process of Example I was repeated using p-phenylenediamine as the aromatic diamine. The resulting product had properties which were very similar to the properties of the product produced in Example I where p,p'-oxybis (aniline) was the aromatic diamine.

I claim:

1. A high molecular weight polymeric compound which consists essentially of recurring units of the group composed of $$\left[ -N=\overset{Z}{\underset{|}{C}}-Y\overset{\overset{O}{\parallel}}{\underset{\underset{\parallel}{C}-OH}{\overset{C-N-R}{\diagup}}} \right]-$$

wherein Y is a trivalent aromatic radical selected from the group consisting of a trivalent benzene radical, a trivalent naphthalene radical, a trivalent diphenyl radical, a trivalent diphenylether radical, a trivalent diphenylsulfide radical, a trivalent diphenylsulfone radical, a trivalent ditolylether radical, and a trivalent benzophenone radical and wherein Z is hydrogen and wherein R is a divalent aromatic hydrocarbon radical, said polymer being suitable for use as a coating composition.

2. The polymeric compound of claim 1 wherein Y is the

3. The polymeric compound of claim 1 wherein said divalent aromatic hydrocarbon radical is 4. The polymeric compound of claim 1 wherein said divalent aromatic hydrocarbon radical is 5. A polyimide-imine consisting essentially of recurring units of $$\left[ -N=\overset{Z}{\underset{|}{C}}-Y\overset{\overset{O}{\parallel}}{\underset{\underset{\parallel}{C}}{\overset{C}{\diagup}\diagdown}}N-R \right]-$$

wherein Y is a trivalent aromatic radical selected from the group consisting of a trivalent benzene radical, a trivalent naphthalene radical, a trivalent diphenyl radical, a trivalent diphenylether radical, a trivalent diphenylsulfide radical, a trivalent diphenylsulfone radical, a trivalent ditolylether radical, and a trivalent benzophenone radical and wherein Z is hydrogen and wherein R is a divalent hydrocarbon radical and wherein said polymers are film and fiber forming and are further characterized by being insoluble, in nitrogen containing organic solvents.

6. The polyamide-imine of claim 1 wherein said divalent hydrocarbon is

7. The polyamide-imine of claim 1 wherein said divalent hydrocarbon is

8. The polyamide-imine of claim 1 wherein Y is the

9. A process for preparing high molecular weight solid polymers having film-forming properties and being soluble in a nitrogen containing organic polar solvent, which process comprises reacting essentially equimolar amounts of an aromatic carbocyclic diamine and a tricarboxylic anhydride carbonyl compound of the formula:

$$Z-\overset{\overset{O}{\parallel}}{C}-Y\overset{\overset{O}{\underset{\parallel}{C}}}{\underset{\underset{\parallel}{C}}{\overset{\diagup}{\diagdown}}}O$$

wherein Y is a trivalent aromatic radical selected from the group consisting of a trivalent benzene radical, a trivalent naphthalene radical, a trivalent diphenyl radical, a trivalent diphenylether radical, a trivalent diphenylsulfide radical, a trivalent diphenylsulfone radical, a trivalent ditolylether radical and a trivalent benzophenone radical and wherein Z is hydrogen in a nitrogen containing organic polar solvent, under substantially anhydrous conditions at a temperature of about 0 to 100° C. producing a polymer with free carboxyl groups and amide groups which are available for further reaction, said polymer being soluble in said nitrogen containing organic solvent.

10. Process of claim 9 wherein the tricarboxylic anhydride carbonyl compound is the 4-aldehyde of trimellitic anhydride.

11. Process of claim 10 wherein the aromatic carbocyclic diamine is p,p'-oxybis (aniline).

12. Process of claim 10 wherein the aromatic carbocyclic diamine is p,p'-methylenebis (aniline).

13. The process of claim 9 wherein said process includes the curing of said polymer for a period of time and at an elevated temperature of about 150 to 400° C. to effectively and substantially convert such carboxyl and amide groups to imide groups, and thereby produce a second polymer which is insoluble in nitrogen containing organic polar solvents.

14. The process of claim 9 wherein said process includes the curing of the polymer produced by reacting the 4-aldehyde of trimellitic anhydride with p,p'-oxybis (aniline) for a period of time at an elevated temperature of about 150 to 400° C. to effectively and substantially convert such carboxyl and amide groups to imide groups and thereby produce a second polymer which is insoluble in nitrogen containing solvents.

15. A solution of the polymer of claim 1 and a nitrogen containing organic solvent.

16. A coated copper wire suitable for high temperature electric service, said copper wire coated with the polyamide-imine of claim 5.

References Cited

UNITED STATES PATENTS 3,260,691  7/1966  Lavin et al. _____ 260—30.2
3,347,828  10/1967  Stephens et al. _____ 260—47

WILLIAM H. SHORT, Primary Examiner

L. L. LEE, Assistant Examiner

U.S. Cl. X.R.

117—232, 132; 260—32.4, 32.6, 65, 72.5, 78